United States Patent [19]

Leifermann

[11] 3,765,568
[45] Oct. 16, 1973

[54] METHOD AND APPARATUS FOR AUTOMATICALLY METERING PREDETERMINED VOLUMINA OF A LIQUID

[76] Inventor: Walter Leifermann, Polostrasse 23, Hamburg, Germany

[22] Filed: Oct. 7, 1971

[21] Appl. No.: 187,386

[30] Foreign Application Priority Data
Oct. 10, 1970 Germany............ P 20 49 784.1
May 29, 1971 Germany............ P 21 26 967.0
June 5, 1971 Germany............ P 21 28 099.9
June 20, 1971 Germany............ P 21 36 104.6

[52] U.S. Cl. ........................................ 222/56
[51] Int. Cl. ....................................... B67d 3/00
[58] Field of Search ............... 222/52, 14, 55, 64, 222/56; 137/395; 73/271, 270

[56] References Cited
UNITED STATES PATENTS
3,526,276  9/1970  Bennett et al. ............ 137/395 X Primary Examiner—Stanley H. Tollberg
Attorney—David Toren et al.

[57] ABSTRACT

A method of automatically metering predetermined volumina of a liquid by arranging the liquid within an airtight enclosure and controlling, in a dispensing operation, the outlet valve by the resulting mechanical deformation of a diaphragm that is in communication with the enclosure and deformable by air pressure variations of the air entrapped within the system. The apparatus essentially comprises a sealed reservoir with an outlet valve, a diaphragm in communication with the reservoir and a sensing device for sensing deformations of the diaphragm to control the outlet valve. An optional timer may provide a no-liquid condition signal.

9 Claims, 6 Drawing Figures

METHOD AND APPARATUS FOR AUTOMATICALLY METERING PREDETERMINED VOLUMINA OF A LIQUID

The present invention relates to a method of and an apparatus for automatically metering predetermined volumina of a liquid.

Various methods and apparatus for metering liquid volumina and especially for metering liquid volumina in beverage vending machines are already known. Most of these heretofore known apparatus measure the liquid directly. These direct measurements are performed either by means of metering pumps or by means of an in-line metering vessel or also by means of a flowmeter. To perform the measurement, the liquids to be metered must pass through the measuring devices. When perishable liquids such as milk are metered by means of devices of this type it is not only necessary to refrigerate the devices but also to clean the devices periodically.

Therefore such known devices require a considerable amount of maintenance by skilled or learned personnel.

There are also known metering devices in which the desired liquid volumina are dispensed through a nozzle with a constant pressure. For determining the volume, the dispensing interval must be accurately determined. In comparison to the above described type of apparatus considerably less maintenance is required for devices of this type. These devices have, however, severe drawbacks which are primarily due to the fact that the viscosity of the dispensed liquid bears directly on the volume dispensed within a certain time interval. For this reason, liquids subject to viscosity variations cannot be metered accurately by means of a device of this type.

All of the heretofore known metering apparatus are suitable for predetermined applications and are only of limited use. It is rather difficult and almost impossible to accurately meter liquid volumina if such operations are not supervised by skilled personnel. Beverage vending machine metering apparatus are generally liable to frequent breakdowns.

It is therefore an object of the present invention to provide a novel and improved method of and a novel and improved apparatus for automatically metering predetermined volumina of a liquid which allow to accurately meter various liquids independent of differing viscosities of such liquids. For achieving this object the present invention proposes a method of automatically metering predetermined volumina of a liquid according to which for the liquid to be metered is provided an enclosure and an outlet valve connected to the enclosure and controlled by mechanical variations or deformations of a foil diaphragm that is deformable by even minute air pressure variations of the air entrapped within the enclosure above the liquid to be metered.

Furthermore the present invention relates to an apparatus for performing the proposed method, the apparatus including a reservoir for receiving the liquid to be metered and having the form of an enclosure; an outlet pipe with an outlet valve connected to the reservoir; an air tube in communication with the air entrapped above the liquid contained in the reservoir and provided with a vent valve; a branch line connected to the air tube, the free end of the branch line connected to a support plate; a diaphragm sealingly fixed to the support plate at the side opposite to the free end of the branch line, the diaphragm hanging by its own weight downwardly from the support plate; an opening in the support plate communicating with a chamber defined by the diaphragm and the support plate and with the branch line; a light barrier into the path of which protrudes the suspending portion of the diaphragm, the light barrier operatively connected through a controller to an actuator switch, the controller controlling the vent valve in the air tube and the outlet valve in accordance with mechanical variations or deformations of the diaphragm caused by any minor air pressure variations of the air entrapped within the reservoir above the liquid.

In comparison to the heretofore known apparatus the apparatus of the present invention does not measure the liquid volume but the air volume required to compensate the liquid volume dispensed from the reservoir.

To provide an indication when the reservoir for the liquid to be metered does no longer contain any liquid the actuator switch may be connected to a timer adapted to indicate an empty reservoir condition in dependence upon a variation or deformation of the diaphragm within a predetermined maximum allowed interval. The timer thus provides in a simple manner an empty signal when the diaphragm has not been lifted within a predetermined maximum interval. Another possibility of providing a no-liquid signal is to arrange a second light barrier for monitoring the normal or inoperative position of the diaphragm in the region of the space occupied by the diaphragm.

The foregoing and other objects will become apparent from the following description of various embodiments of the present invention when taken in conjunction with the accompanying drawings.

Figure 1:
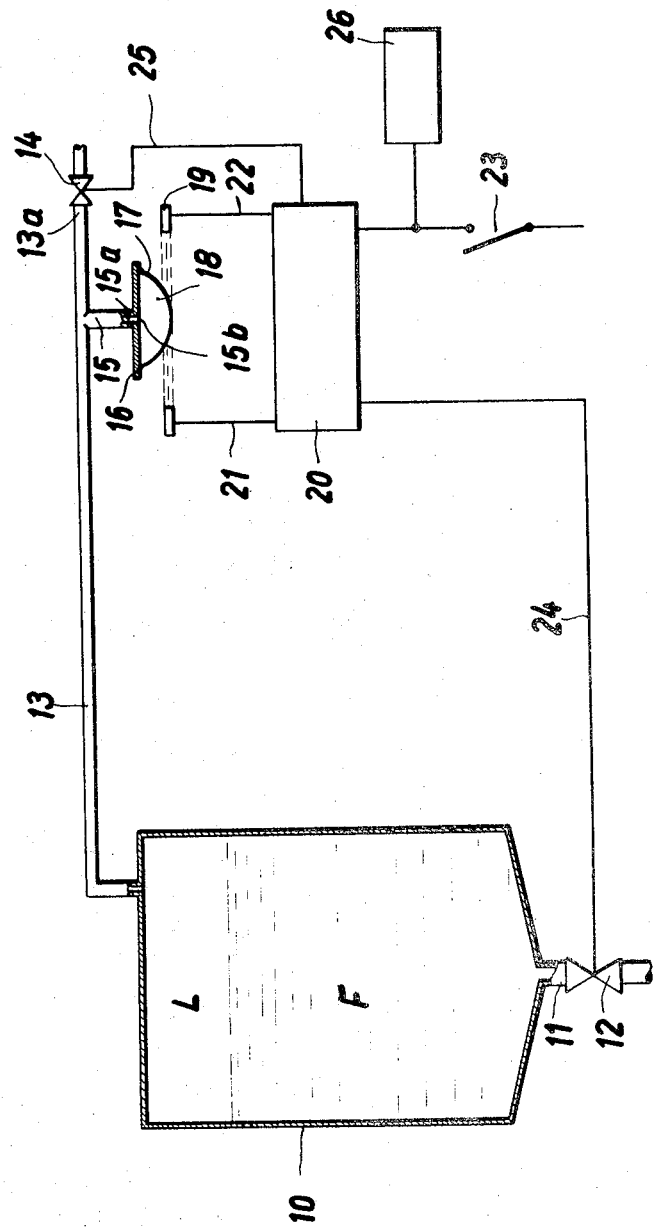
FIG. 1 shows schematically, partly in elevation and partly in a vertical elevational cross-section view, a first embodiment of a metering apparatus according to the invention, the apparatus including a diaphragm adapted to vary its shape under the influence of a volume reduction in a liquid reservoir, the diaphragm being arranged in the path of a light barrier connected to a controller.

Referring to FIG. 1 of the drawings, the first embodiment of the metering apparatus according to the present invention comprises a sealed reservoir 10 for receiving the liquid F to be metered. An outlet pipe 11 is preferably arranged at the bottom of the reservoir and provided with an outlet valve 12. The air space above the liquid F within the reservoir 10 is designated by the letter L.

The reservoir 10 is connected to an air tube 13 opening into the upper air space L of the reservoir 10. A vent valve 14 is connected to the free end 13a of the air tube. The outlet valve 12 and the vent valve 14 preferably consist of solenoid operated control valves.

A branch line 15 is connected with an intermediate portion of the air tube 13 and provided at its free end 15a with a support plate 16. A diaphragm 17 is sealingly attached to the surface of the support plate 16 opposite to the free end 15a of the branch line 15. The diaphragm 17 hangs by its own weight downwardly from the support plate 16 and defines in conjunction with the support plate 16 an enclosed chamber 18 which communicates through the opening 15b of the branch line 15 and the branch line with the air tube 13. The diaphragm 17 is made of an airtight thin foil material.

A light barrier 19 is provided in the zone occupied by the diaphragm 17 and connected through the leads 21, 22 to a controller 20 and is operatively connected to an actuator switch 23. The controller 20 is moreover connected through a connecting lead 24 to the outlet valve 12 and through another connecting lead 25 to the vent valve 14.

Figure 2:
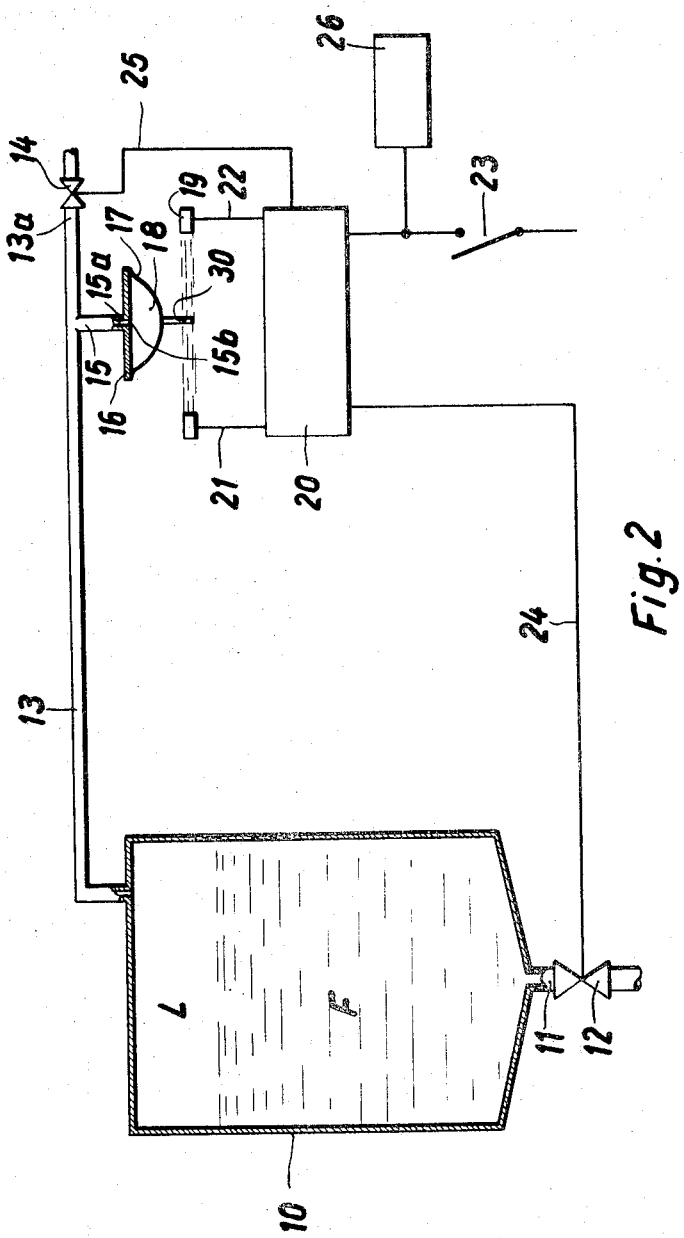
FIG. 2 is a schematical view, partly in elevation and partly in a vertical cross-section of another embodiment of the metering apparatus according to the invention including a control rod attached to the diaphragm and protruding into the path of the light barrier.

In the embodiment shown in FIG. 2 a control rod 30 is attached to the diaphragm 17, preferably in the center thereof, and consists of a piece of cardboard, carton, plastic or metallic material which hangs downwardly from the diaphragm. Preferably the control rod 30 is formed as a weight adapted to pull the diaphragm 17 downwardly from a position in which the diaphragm is attracted upwardly when the medium attracting the diaphragm 17 no longer acts on the same. The light barrier 19 is arranged in the zone occupied by the control rod 30. By using a control rod 30 accurate measurements of variations of the diaphragm 17 may be performed thus allowing faster dispensing of beverages.

Figure 3:
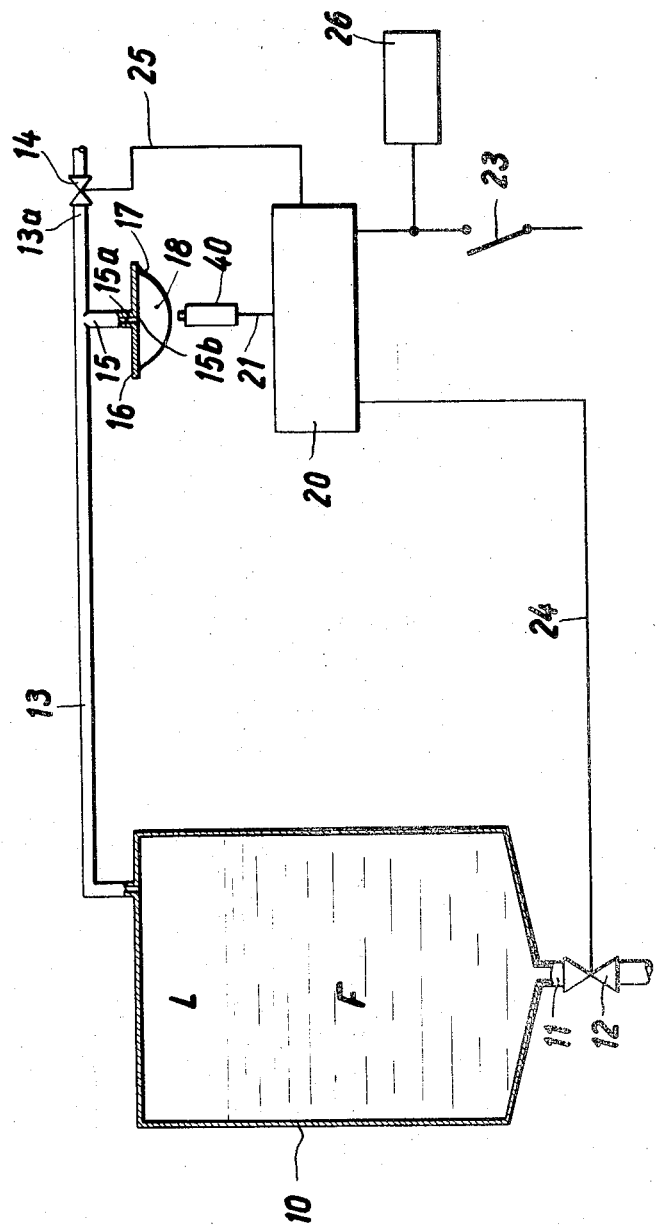
FIG. 3 is a schematical view, partly in elevation and partly in a vertical cross-section of another embodiment of the metering apparatus according to the invention in which the diaphragm is arranged in the vicinity of a proximity initiator connected to the controller.
Figure 4:
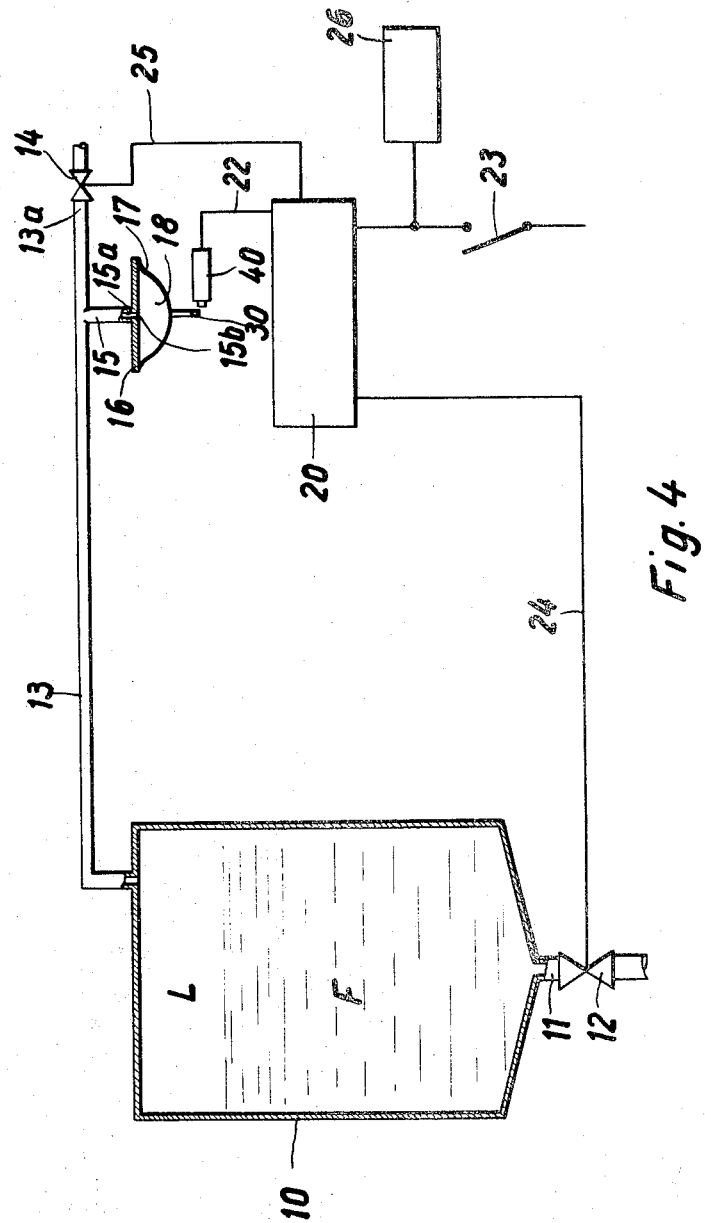
FIG. 4 shows another embodiment similar to the one shown in FIG. 3 wherein a control rod is attached to the diaphragm.

According to the further embodiment shown in FIG. 3 a proximity initiator 40, i.e., a resonant circuit oscillator is arranged in the vicinity of the diaphragm 17, and the outer surface of the diaphragm is provided with a metallic coating. The proximity initiator 40 is connected through the lead 21 to the controller 20. The proximity initiator 40 may also be arranged in the vicinity of the control rod 30 attached to the diaphragm 17 in which case the control rod 30 would be made of a metallic material (FIG. 4). Instead of the proximity initiator 40 any other mechanical or electrical sensing, tracing or scanning device may be employed. Employing proximity initiators for control purposes has the advantage of a higher accuracy of beverage dispensing whereby the disadvantages associated with light barriers are avoided.

Figure 5:
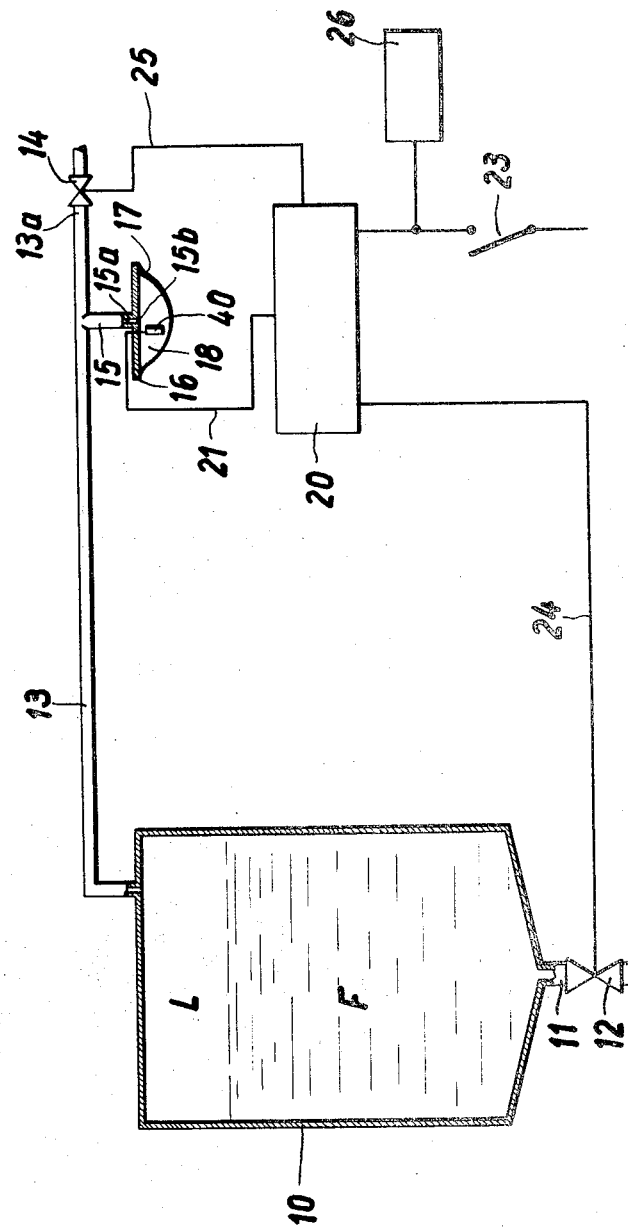
FIG. 5 is a schematical view, partly in elevation and partly in a vertical cross-section of another embodiment of the metering apparatus according to the invention wherein a proximity initiator is arranged within the space enclosed by the diaphragm.
Figure 6:
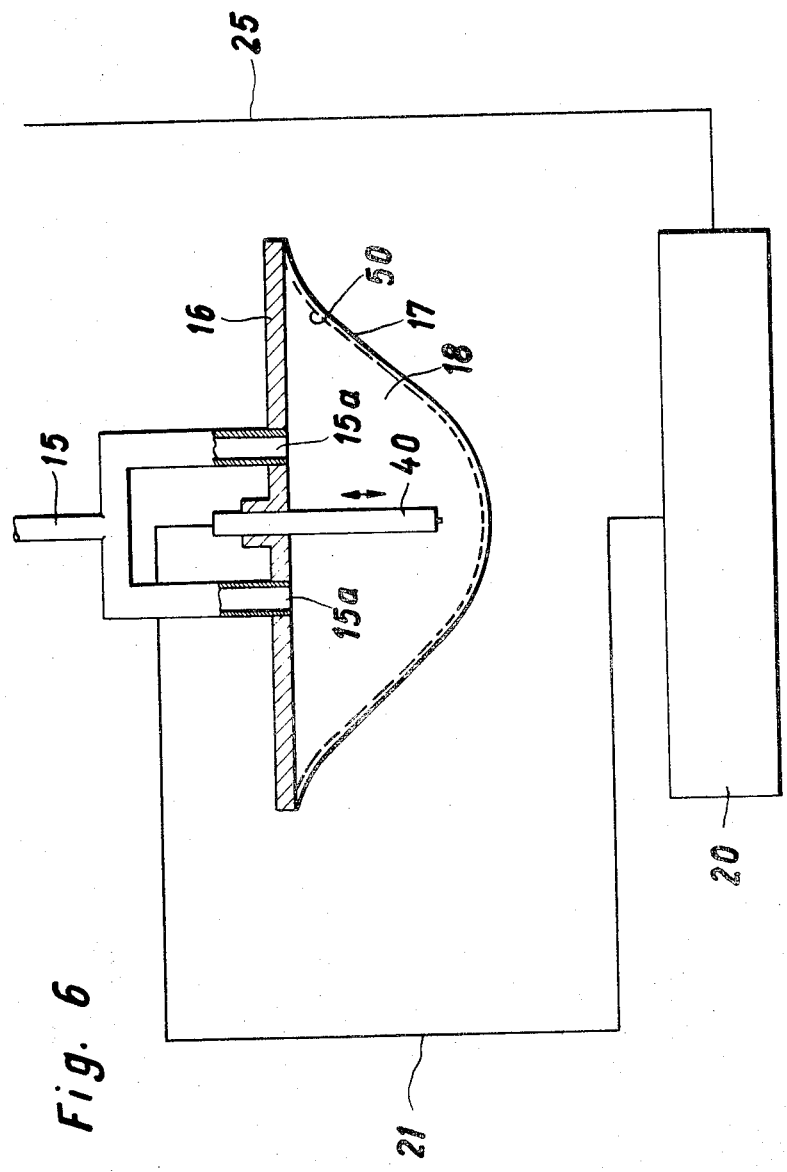
FIG. 6 is an enlarged fragmentary schematical view of the diaphragm and the controller, partly in section and partly in elevation.

In the further embodiment shown in FIGS. 5 and 6, the proximity initiator 40 is mounted at the lower surface of the support plate 16 for the diaphragm 17 in such a manner that the initiator does not interfere with the communication between the interior of the lines 13, 15 and the enclosed chamber defined by the diaphragm 17. To adapt the spacing of the proximity initiator 40 from the inner surface of the diaphragm 17 for various liquid volumina, the proximity initiator 40 is longitudinally movably mounted in the support plate 16. The adjustment of the elevation of the proximity initiator 40 may be effected by means of a screw or any other suitable means not shown in the drawings.

The operation of the apparatus according to the invention for performing the method of automatically metering predetermined volumina of a liquid is as follows: The reservoir 10 is filled with a liquid and then sealed and connected to the air tube 13. The level of the liquid F may be at any desired elevation. When de-energized, the vent valve 14 is open so that the air pressure within the liquid reservoir 10 corresponds to the atmospheric pressure. The diaphragm 17 which is made of a light weight airtight material hangs by its own weight and free from tensions in a curved configuration downwardly as may be seen in the drawings. The light beam of the light barrier 19 is interrupted by the diaphragm 17 or by the control rod 30. When deenergized, the outlet valve 12 is closed so that no liquid may be dispensed from the reservoir 10. When actuating the switch 23, the controller 20 trips the dispensing device and switches on the light barrier 19 whereby simultaneously the outlet valve 12 and the vent valve 14 are energized having the effect that the vent valve 14 closes and the outlet valve 12 opens. Thus liquid F may flow out through the outlet pipe 11.

By the liquid F discharged from the reservoir 10 the volume within the reservoir 10 is reduced. This volume reduction is compensated for by lifting of the diaphragm 17. As soon as the desired or respectively predetermined liquid volume has been discharged, the diaphragm 17 has moved out of the path of the light barrier 19 since the diaphragm 17 is raised to compensate the volume reduction within the reservoir 10. The light pulse provided thereby at the light barrier switches off the controller 20 so that the outlet valve 12 will be closed and the liquid flow from the reservoir 10 stopped whereas simultaneously the vent valve 14 will be opened. In the open position of the vent valve 14 outside air may pass through the air tube 13 into the interior of the reservoir and through the branch line 15 into the enclosed chamber 18 defined by the diaphragm 17 so that the diaphragm 17 drops back into its normal or inoperative position in which it blocks the path of the light barrier 19. This described cycle will be repeated upon reactuation of the switch 23. The dispensed liquid volumina will always be identical, and the diaphragm 17 will always be lifted by the same amount whereby the controller 20 is switched off.

When together with the tripping of the dispensing device a timer 26 is energized which operates as long as the two valves 12 and 14 are energized, the timer may readily be used to provide a no-liquid signal when the lifting of the diaphragm 17 does not occur within a predetermined maximum interval. Another possibility of providing an empty signal is to arrange within the zone occupied by the diaphragm 17 a second light barrier not shown in the drawing and adapted to monitor the normal or inoperative position of the diaphragm. In case that the reservoir 10 is depleted, i.e., there is no liquid F left within the reservoir, the air compensation will take place through the outlet valve 12 so that during the dispensing operation the diaphragm 17 will remain in its inoperative position.

For metering different liquid volumina the spacing of the light barrier 19 from the diaphragm 17 is adjustable.

By means of the method of the present invention and the apparatus adapted to perform this method, predetermined liquid volumina may be automatically metered whereby viscosity variations which may be caused by varying liquid characteristics or by temperature fluctuations cannot affect the accuracy of the dispensing operation. The novel apparatus may likewise be employed if the reservoir 10 consists of a lost container adapted to be inserted into the correspondingly arranged vending machine and automatically opened and connected to the dispensing device in the above described manner. The metering apparatus also allows accurate metering of juices of a very high high viscosity such as above 60° Brix.

The invention is not restricted to the above described and illustrated embodiments. Modifications such as to employ mechanical or electronic sensor devices instead of the light barrier 19 should be considered to be within the scope of the present invention. If the liquid to be metered is stored within a container of an elastic material, the container may be accommodated within an airtight enclosure adapted to perform the function of the reservoir 10 so that air pressure changes caused by deformations of the elastic container walls are avoided.

What is claimed is:

1. A method of automatically metering predetermined volumina of a liquid, comprising the steps of forming a closed system including a reservoir for dispensing the liquid, charging the liquid to be dispensed into the reservoir, filling the remainder of the system including the reservoir with air at atmospheric pressure, closing the system, discharging liquid from the reservoir, checking the variation in air pressure within the closed system and closing off the flow of liquid from the reservoir in response to a predetermined pressure variation, with the flow of liquid from the reservoir closed, opening the system and filling the system with air at atmospheric pressure and closing the system, repeating these steps for automatically discharging predetermined volumina of liquid.

2. An apparatus for automatically metering predetermined volumina of a liquid, comprising a reservoir for receiving the liquid to be metered and having the form of an enclosure; an outlet pipe with an outlet valve connected to the reservoir; an air tube in communication with the air entrapped above the liquid contained in the reservoir and provided with a vent valve; a branch line connected to the air tube, the free end of the branch line connected to a support plate; a diaphragm sealingly fixed to the support plate at the side opposite to the free end of the branch line, the diaphragm hanging by its own weight downwardly from the support plate; an opening in the support plate communicating with a chamber defined by the diaphragm and the support plate and with the branch line; a light barrier into the path of which protrudes the suspending portion of the diaphragm, the light barrier operatively connected through a controller to an actuator switch, the controller controlling the vent valve in the air tube and the outlet valve in accordance with mechanical variations or deformations of the diaphragm caused by any minor air pressure variations of the air entrapped within the reservoir above the liquid.

3. An apparatus as defined in claim 2 wherein the vent valve and the outlet valve each consist of a solenoid operated control valve, and in the deenergized initial condition of the apparatus the vent valve is in its open position and the outlet valve is in its closed position.

4. An apparatus as defined in claim 2 wherein the actuator switch is connected to a timer adapted to indicate an empty reservoir condition in dependence upon a variation or deformation of the diaphragm within a predetermined maximum interval.

5. An apparatus as defined in claim 2 wherein is provided a second light barrier for monitoring the normal position of the diaphragm in the region of the diaphragm.

6. An apparatus as defined in claim 2 wherein the spacing of said mentioned light barrier from the diaphragm is adjustable.

7. An apparatus as defined in claim 2 wherein the diaphragm is made of an airtight thin foil material.

8. An apparatus as defined in claim 2 wherein the reservoir for the liquid consists of a lost container adapted to be connected to the outlet pipe with the outlet valve, and to the dispensing device.

9. An apparatus as defined in claim 2 wherein the reservoir for receiving the liquid is made of an elastic material and is adapted to be inserted into an airtight enclosure adapted to take over the function of the reservoir.

* * * * *